J. L. R. HAYDEN.
PROTECTIVE DEVICE.
APPLICATION FILED APR. 6, 1909.
981,760.
Patented Jan. 17, 1911.
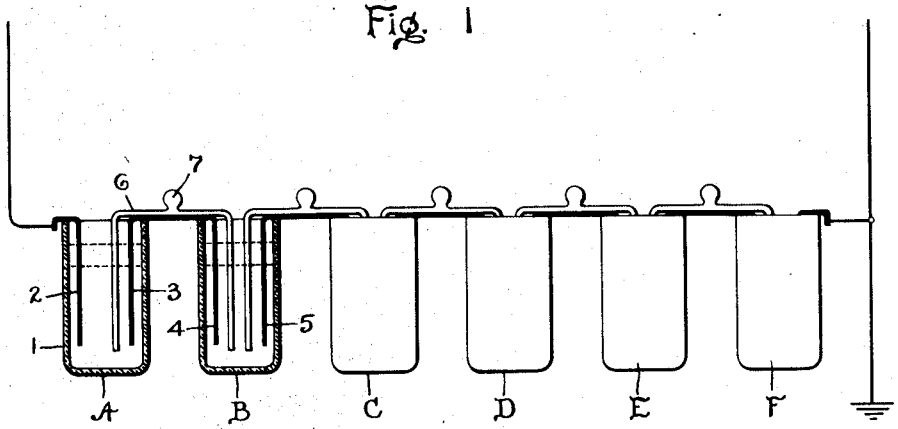
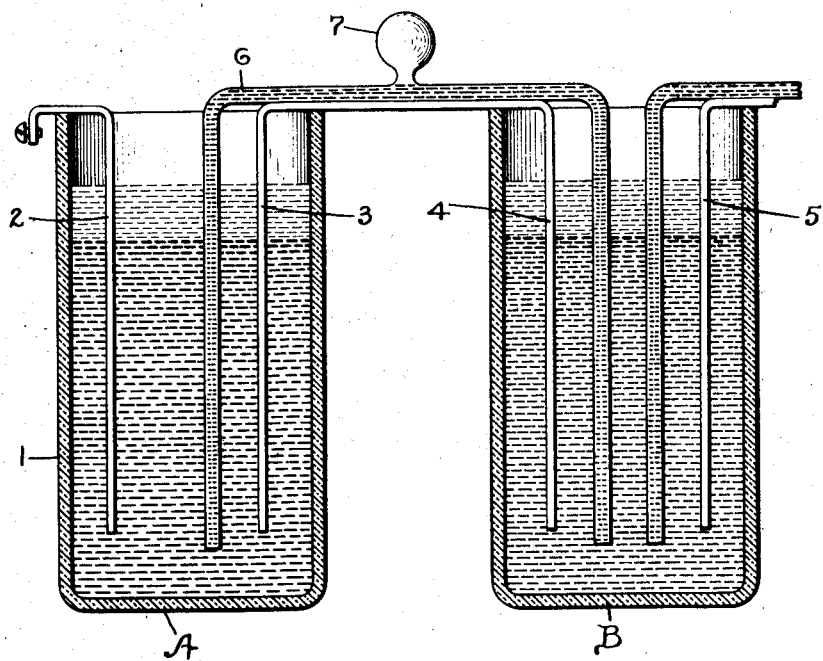
WITNESSES:
INVENTOR
JOSEPH L. R. HAYDEN.
BY
ATT'Y.

UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

PROTECTIVE DEVICE.

981,760.  Specification of Letters Patent.  Patented Jan. 17, 1911.

Application filed April 6, 1909. Serial No. 488,263.

*To all whom it may concern:*

Be it known that I, JOSEPH L. R. HAYDEN, a citizen of the United States, residing at Schenectady, in the county of Schenectady, State of New York, have invented certain new and useful Improvements in Protective Devices, of which the following is a specification.

My invention relates to protective devices in which a plurality of electrolytic cells are connected in series to a transmission line or similar conductor to relieve it of abnormal potentials due to lightning, surges, switching strains and the like, and more particularly to protective devices in which the electrolytic cells are provided with aluminum electrodes and are so connected that the protective device is continuously in service. An electrolytic cell having aluminum electrodes immersed in a suitable electrolyte will normally prevent any flow of current as long as the difference of potential between the two electrodes of a cell is near the operating voltage of about 240 to 300 volts, because the electrodes become coated with a film of very high resistance, but as soon as the difference of potential exceeds the critical point of about 500 volts the film breaks down and current will flow freely. This property of electrolytic cells with aluminum electrodes makes them desirable for relieving conductors or transmission lines from excessive voltage, but in order to use them on systems operating at commercial voltages several cells must be connected in series. On a 2300 volt transmission line, for instance, about 10 cells connected in series would be required between the transmission line and the ground, and although each cell should control one-tenth of the total voltage, it is found in practice that the cells differ in resistance, probably owing to differences in thickness of film, and consequently the difference of potential between the electrodes in some of the cells will be more and in others will be less than 230 volts. The temperature of the cells depends on the power consumed in them, and since all the cells in series receive the same current, an increase of voltage on some of the cells causes them to become hotter, and to evaporate their electrolyte more rapidly than others, while the voltage distribution may become so unequal that some of the cells boil out their electrolyte at the normal potential of the line and either the circuit through the device is opened or the device is damaged.

The object of my invention is to overcome the difficulties which arise in connection with unequal voltage distribution between the cells and to practically equalize the voltage between the cells in a simple and reliable manner.

In carrying out my invention, the electrolytes of the successive cells are electrically connected to each other by a connection in shunt to the aluminum electrodes in the cells, and in the preferred construction the adjacent cells are connected by means of tubes or siphons which open into the cells and are filled with electrolyte, so that the electrolytes of the adjacent cells are in electrical connection both through the electrodes and through the electrolyte in the tubes. The tubes are preferably made U-shaped with their ends dipping into the electrolytes of adjacent cells to form siphons filled with electrolyte. In order to prevent bubbles of gas breaking the electrical connection between the electrolytes of the adjacent cells, the tubes are provided with gas retaining chambers or enlargements.

My invention will best be understood in connection with the accompanying drawing, which is merely an illustration of one of the various forms in which it may be embodied and in which—

Figure 1 shows a number of electrolytic cells connected in series between a conductor and the ground, two of the cells being shown in section; and Fig. 2 is a vertical section through two adjacent cells, showing the arrangement of the electrodes and the bent tube filled with electrolyte.

In the specific form shown in Fig. 1, six electrolytic cells, A, B, C, D, E and F are connected between the conductor and the ground for the purpose of permitting abnormal potentials on the conductor to discharge through the cells to ground. Each electrolytic cell comprises a vessel 1 of any suitable material not attacked by the electrolyte contained in it, the electrolyte having on its surface a layer of protecting liquid lighter than the electrolyte. The cell A has aluminum electrodes 2 and 3 mounted to project into the electrolyte in the vessel 1, while the cell B has similar aluminum electrodes 4 and 5, immersed in the electrolyte as clearly shown in Fig. 2. The cells are connected in series by means of an electrical connection between the electrode 3 of cell A and electrode 4 of cell B, while the electrode 5 is electrically connected to one of the electrodes of cell C, and so on through the series.

If the difference of potential between the electrodes 2 and 3 is greater or less than the difference between the electrodes 4 and 5, the cell A will heat more or less than cell B, and in order to equalize the distribution of voltage among the cells of the series, and to insure that each cell will take approximately its share of the voltage, I connect the electrolyte in cell A with the electrolyte in cell B by means of an electrical connection in shunt to the electrodes 3 and 4, so that the current flowing from electrode 2 to electrode 5 may flow both through the electrodes 3 and 4 and also through a path in shunt to those electrodes. The electrical connection between the electrolytes may be made in various ways as long as it is in shunt to the electrodes, but in the preferred construction the connection is made through a tube terminating in the electrolytes of adjacent cells and normally filled with electrolyte so as to form an electrical connection.

In the preferred construction, the tube 6 of glass or other suitable material is bent in the form of a U, as best shown in Fig. 2, and is arranged so that its ends dip into the electrolytes of adjacent cells while the tube is kept filled with electrolyte. In Fig. 2 the bent tube 6 dips into the electrolyte in cell A and also into the electrolyte in cell B and forms an electrical connection between the cells in shunt to the electrodes 3 and 4. In order to prevent bubbles of gas in the tube 6 from breaking the electrical connection between the electrolytes, the tube is provided at the top with an enlargement 7, which acts as a gas chamber and insures that under all conditions there will be a sufficient amount of electrolyte in the tube 6 to maintain the cells A and B in electrical connection. As a result of this arrangement, if the normal difference of potential between the electrodes 2 and 5 is about 250 volts and the difference between the electrodes 2 and 3 becomes only 200 volts, while between 4 and 5 it is 300 volts, a current will flow through the glass tube 6, since the current can flow both through the tube 6 and also through the electrodes 3 and 4, and the voltage difference between the coils is thereby equalized and brought back to normal. If the electrolyte in one cell evaporates out faster than in the other cells, some electrolyte will be siphoned into the defective cell from the adjacent cells and the level of the electrolyte in all of the cells will be kept substantially the same. The tube or siphon 6 therefore controls the current through the cells in such a manner as to give an inherent tendency to distribute the voltage properly. Moreover the cell which has the higher resistance will heat more rapidly than the adjoining cell of lower resistance and the liquid becoming lighter will give less hydrostatic pressure and cause the one heating to draw liquid through the siphon to equalize the pressure, thus maintaining an even potential drop among the several cells.

The invention is not limited to aluminum electrodes as other metals have the same property. My invention includes any metal electrode which will form a resistance film.

My invention may be embodied in many other forms than that described and I do not limit myself to the precise arrangement disclosed, but intend in the appended claims to cover all modifications which are within the spirit and scope of my invention.

What I claim as new and desire to secure by Letters Patent of the United States, is—

1. A protective device comprising a plurality of vessels each containing an electrolyte and two electrodes having a film of high resistance thereon and mounted to terminate in the electrolyte, one electrode in each vessel being connected to an electrode in an adjacent vessel, and an electrical connection between the electrolytes in adjacent vessels in shunt to the electrodes in said adjacent vessels.

2. The combination with a conductor of a transmission line, of a discharge path comprising a plurality of vessels, each containing an electrolyte and electrodes immersed in the electrolyte with their submerged surface covered with a high resistance film, said electrodes being connected in series, and means for connecting the electrolytes in said vessels in series with each other and in shunt to said electrodes.

3. In a protective device for relieving a conductor of abnormal potential, a discharge path comprising a plurality of vessels, each containing an electrolyte and two electrodes mounted to terminate in the electrolyte and having on their wetted surfaces a film of high resistance, said electrodes being connected in series, of a connection between the electrolytes of adjacent vessels which offers to current flow between said electrolytes a resistance greater than the resistance offered to current flow by the connected electrodes of said vessels.

4. The combination with a conductor subject to abnormal potential, of a discharge path having one end connected to said conductor and the other end to ground, said discharge path comprising a plurality of vessels each containing an electrode and an electrolyte which coöperates with said electrode to form thereon a high resistance film, the electrodes of said vessels being connected in series, and a tube opening into adjacent vessels and filled with electrolyte to form an electrolytic connection between said vessels in shunt to said electrodes.

5. The combination with a conductor subject to abnormal potentials, of a discharge path comprising a plurality of vessels each containing two electrodes, and an electrolyte which submerges part of said electrodes and forms thereon a film of high resistance, said electrodes being connected in series, of a tube bent to bring its ends below the level of the electrolyte in adjacent vessels and filled with an electrolyte to form an electrical connection between said vessels.

6. In a protective device, the combination with a plurality of cells each comprising a vessel containing two electrodes, and an electrolyte submerging said electrodes and cooperating therewith to form on said electrodes a film of high resistance, said electrodes being connected in series, of a siphon between adjacent cells filled with an electrolyte.

7. In a protective device, the combination with a plurality of cells each comprising a vessel containing an electrolyte and two electrodes mounted to terminate in the electrolyte, the electrodes of said cells being connected in series, of a siphon between adjacent cells filled with an electrolyte to form an electrical connection between said cells, said siphon having a gas retaining enlargement at its highest point.

In witness whereof, I have hereunto set my hand this 5th day of April, 1909.

JOSEPH L. R. HAYDEN.

Witnesses:
BENJAMIN B. HULL,
HELEN ORFORD.